United States Patent [19]

Quinlivan

[11] 4,046,341
[45] Sept. 6, 1977

[54] AIRCRAFT ANGLE-OF-ATTACK AND SIDESLIP ESTIMATOR

[75] Inventor: Richard Paul Quinlivan, Binghamton, N.Y.

[73] Assignee: General Electric Company, Binghamton, N.Y.

[21] Appl. No.: 672,028

[22] Filed: Mar. 30, 1976

[51] Int. Cl.$^2$ .............................................. G05D 1/08
[52] U.S. Cl. ........................... 244/181; 235/150.1; 235/150.2; 244/179; 318/561; 318/584; 244/195; 244/191
[58] Field of Search ................... 73/178 R; 235/150.2, 235/150.26, 150.1, 185, 197; 244/177, 179, 181, 184, 186, 191, 195; 318/584–586, 561; 340/27 R

[56] References Cited

U.S. PATENT DOCUMENTS

| | | | |
|---|---|---|---|
| 3,446,946 | 5/1969 | Andeen | 244/195 X |
| 3,654,443 | 4/1972 | Dendy et al. | 235/150.2 |

OTHER PUBLICATIONS

Brock et al., General Questions on Kalman Filtering in Navigation Systems, CH. 10 Theory and Applications of Kalman Filtering, Agard., AG139, Feb. 1970, pp. 205-230.

*Primary Examiner*—Stephen G. Kunin
*Attorney, Agent, or Firm*—I. David Blumenfeld

[57] ABSTRACT

The instant invention relates to a system for estimating aircraft angle of attack $\alpha$ and sideslip angle $\beta$ from measured quantities such as angular body rate and linear acceleration. The estimated angle of attack and sideslip signals are generated by means of a Kalman filter configuration which simulates a model of the aircraft angle of attack and sideslip angle dynamics, and may be used either in an aircraft flight control network or for display purposes.

3 Claims, 2 Drawing Figures

FIG. I

AIRCRAFT ANGLE-OF-ATTACK AND SIDESLIP ESTIMATOR

INVENTION

The instant invention relates to a signal generating network for producing signals proportional to aircraft angle of attack and aircraft sideslip angle, and more particularly, for generating these estimated signals from certain measured aircraft parameters.

It has long been recognized that signals representative of aircraft angle of attack and aircraft sideslip angle and their respective time derivatives are useful for aircraft flight control augmentation purposes. In the past, and at present, signals from angle of attack and sideslip aerodynamic probes and sensors cannot be utilized as part of control feedback computations because of measurement corruption inherent in measurement of local aerodynamic flow fields around the aircraft surfaces where these probes are positioned. For example, a typical angle of attack probe at the air foil surface of an aircraft is, under various circumstances, subject to severe variations and rapid perturbations of the air flow. As a result, the signal from the probe is masked by interfering or noise signals. While it is possible to process the noisy signal by means of filtering techniques to extract the useful information, the magnitude of filtering required reduces bandwidth to an unacceptably low level and so increases the response time that use of the signal for control purposes is seriously affected.

It is therefore desirable to provide signal processing circuitry for producing optimal estimates of angle of attack and sideslip from other more readily measured parameters such as aircraft pitch, roll, etc. Applicant has found that such angle of attack and sideslip angle estimator circuitry may be readily provided through the formulation of a network in the form of a Kalman filter which represents the model of the aircraft angle of attack and sideslip angle dynamics.

It is therefore a primary objective of the instant invention to provide a network for estimating angle of attack and sideslip indirectly.

Another objective of the invention is to provide an angle of attack estimator in which an estimated angle of attack signal is indirectly generated.

Yet another objective of the invention is to provide an aircraft sideslip estimating network in which the signal representative of aircraft sideslip is generated indirectly.

Other objectives of the instant invention will become apparent as the description proceeds.

The instant invention is premised on the concept of generating signals proportional to angle of attack and sideslip through the indirect processing of such easily measured aircraft parameters as pitch, roll, surface deflection, or the like in a suitable network representing the model of the aircraft dynamics to produce accurate outputs of the angle of attack and the sideslip angle.

The novel features which are characteristic of this invention are set forth with particularity in the appended claims. The invention itself however, both as to its organization and method of operation, together with other objectives and advantages thereof may best be understood by reference to the following description taken in connection with the acompanying drawings in which:

Figure 1:
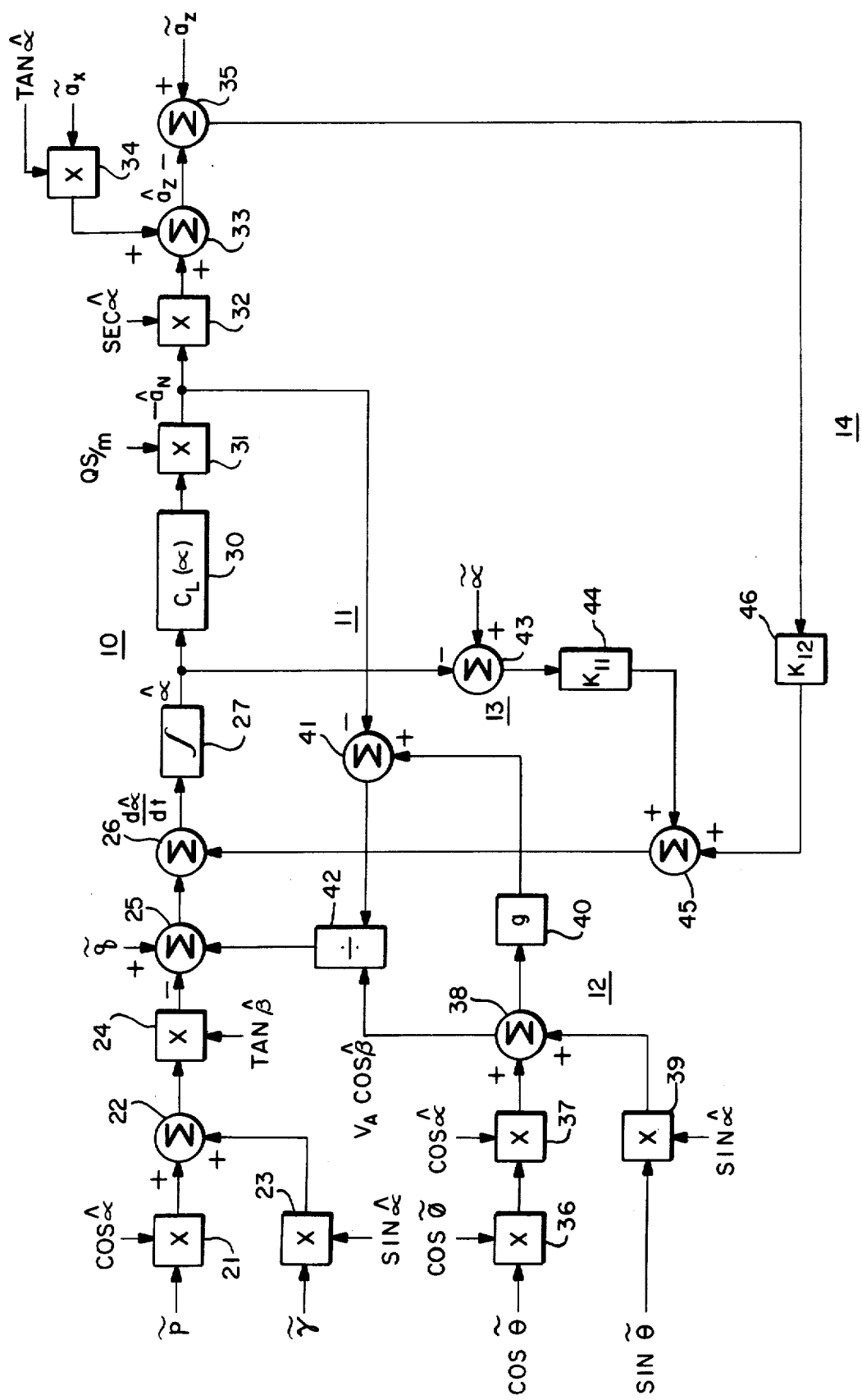
FIG. 1 is a block diagram of circuitry for producing estimated angle of attack for aircraft.

It will be useful in understanding the nature of the problem and the solution proposed through the instant invention, to discuss initially the physical and mathematical relationships between aircraft body angular rates and linear acceleration and the manner in which signals representative thereof are processed to generate angle of attack and sideslip signals. Kalman and Bucy in the Article entitled, "New Results in Linear Filtering and Prediction Theory," Kalman, R. E., Bucy, R. S., Journal of Basic Engineering A.S.M.E. March 1961 point out that for any message process of the following sort:

$$dx/dt = F(T) \times (t) + G(t) \omega (t) \quad (1)$$

$$x(t) = H(t) \times (t) + V(t) \quad (2)$$

where $x$ is the state of the system generating the message, which system is characterized by matrices i $F(t)$, $G(t)$, $H(t)$; $\omega(t)$ is a vector white noise process which drives $x(t)$ and has the expected value $$E[\omega(t)] = \overline{\omega}(t) \quad (3)$$

and a variance:

$$E[(\omega - \overline{\omega})(\omega - \overline{\omega})^T] = Q(t) \delta(t - t') \quad (4)$$

where $\delta(t - t')$ is the delta function defined by:

$$\int_{-\infty}^{\infty} y(t) \delta(t - t') dt = y(t') \quad (5)$$

In this connection, it is known that $V(t)$ is a white noise process which corrupts measurement of $x$ through H.

$$V = (E(V)(t)) = 0$$

$$E[(V - \overline{V})(V - \overline{V})^T] = R(t) \delta(t - t') \quad (6)$$

The optimal estimate of $x$, i.e., $\hat{x}$ is given by the Equation $$\frac{d\hat{x}}{dt} = F\hat{x} + Gw + K[Z - H\hat{x}] \quad (7)$$

The gain matrix K for the aforesaid is given by Kalman, et al as:

$$K = PH^T R^{-1} \quad (8)$$

$$dp/dt = FP + PF^T + GQG^T - KRK^T \quad (9)$$

Where P is the covariance or expected value of the error in the optimal estimate, i.e., $$E(\hat{x} - \overline{x})(\hat{x} - \overline{x})^T = P(t) \quad (10)$$

Equation 9 may be used to compute optimal values of gain matrix K which is required by filter equation 7. Other considerations such as nonlinearities in message process (Equation 1) or uncertainties in the knowledge of matrices F and G (Equation 7) may require modification of matrix K which modify it from values given by equations 9 in an empirical manner dependent upon the particular aircraft this invention is applied to. In order to implement a construction of a filter of the Kalman type in accordance with Equation 7 a suitable model of angle of attack and sideslip angle dynamics must be obtained. The vehicle force equation for any given aircraft can be written with respect to the body axes of the aircraft as follows:

$$du/dt + g \sin\theta - rv + qw = a_x \quad (11)$$

$$dv/dt - g \cos\theta \sin\phi + ru - pw = a_y \quad (12)$$

$$dw/dt - g \cos\theta \cos\phi \, pv - qu = a_z \quad (13)$$

where $u$, $v$ and $w$ are linear velocities along fixed body axes $x,y,z$ respectively, where $x$ is the longitudinal axis of the vehicle, $y$ is the transverse or lateral axis along the wing and $z$ is the axis normal to the $x$ and $y$ axes. Angular rates $p,q$ and $r$ are angular body rates about the axes $x$, $y$ and $z$ respectively. Angles $\theta$ and $\phi$ are Euler angles which define the effect of gravity forces on the vehicle with $\theta$ the angle between the $x$ axis and the horizontal and $\phi$ the angle of rotation of the $y$ axis, about $x$ from parallelism with the horizon. $a_x$, $a_y$, $a_z$ are the accelerations along their respective axes. The angle of attack $\alpha$ is defined by the Equation:

$$\tan\alpha = w/u \quad (14)$$

Similarly, the sideslip angle $\beta$ is defined by the Equation $$\tan\beta = v/\sqrt{u^2 + w^2} \quad (15)$$

When $u^2 + w^2$ is the component of total velocity in the plane of symmetry. From Equations 14 and 15 we can then drive an Equation for the rate of change of angle of attack with time as follows:

$$\frac{d\alpha}{dt} = \cos^2\alpha \left[ \frac{\frac{dw}{dt}}{u} - \frac{w\frac{du}{dt}}{u^2} \right] \quad (16)$$

$$\frac{d\beta}{dt} = \cos^2\beta \left[ \frac{\frac{dv}{dt}}{\sqrt{u^2 + w^2}} - \frac{u\frac{du}{dt}v}{(u^2 + w^2)^{3/2}} - \frac{w\frac{dw}{dt}}{(u^2 + w^2)^{3/2}} \right] \quad (17)$$

From Equations 11 through 17, we can determine that the rate of change of the angle of attack and the rate of change of sideslip angle with time is:

$$\frac{d\alpha}{dt} = q - \tan\beta [p \cos\alpha + r \sin\alpha] + \frac{a_N}{V_A \cos\beta} \quad (18)$$

$$+ \frac{g}{V_A \cos\beta} [\cos\theta \cos\phi \cos\alpha + \sin\theta \sin\alpha]$$

$$\frac{d\beta}{dt} = p \sin\alpha - r \cos\alpha + \frac{a_y \cos\beta - (a_x \cos\alpha + a_z \sin\alpha) \sin\beta}{V_A} \quad (19)$$

$$+ \frac{g}{V_A} [\cos\theta \sin\phi \cos\beta - \sin\theta \sin\beta \cos\alpha -$$

$$\cos\theta \cos\phi \sin\alpha \sin\beta]$$

Where $V_A$ is the velocity of aircraft and $a_N$ is the acceleration normal to the velocity vector, and is colinear with $a_z$, the acceleration along the $z$ axis, when the angle of attack $\alpha = 0$. $a_N$ may be further defined in terms of acceleration components along the aircraft body axes and the angle of attack as:

$$a_N = a_z \cos\alpha - a_x \sin\alpha$$

$$a_N = -Q \frac{S}{m} C_L \left( \delta, \rho, M, d, q, \frac{d\alpha}{dt} \right) \quad (20)$$

$$a_N = -(\tfrac{1}{2}\rho V_A^2)\left(\frac{S}{m}\right) C_L\left(\alpha, \rho, M, \delta, q, \frac{d\alpha}{dt}\right) \quad (21)$$

The acceleration $a_N$ which is normal to the velocity vector is as shown in Equation 21, a function of the coefficient of lift $C_L$ of the aircraft (which in turn, is a function of the angle of attack $\alpha$, the air density $\rho$, the deflection of the tail surface $\delta$, pitch angle rate $q$ as well as the rate of change of angle of attack) $d\alpha/dt$, $Q$, (where $Q = \tfrac{1}{2}\rho V_A^2$), the airfoil surface S and the mass of the aircraft $m$. Since the angle of attack $\alpha$ eventually effects the acceleration normal to the velocity vector, $a_N$ as well as the acceleration along the body axis $a_z$ it is desirable to generate from the estimated angle of attack signal, both a signal which represents the acceleration normal to the velocity vector, i.e., $a_N$ as well as a signal $a_z$ which represents acceleration which is colinear with the body axis $z$ of the aircraft. The relationship between normal acceleration $a_N$, body axis accelerations $a_z$ and $a_x$ and the angle of attack $\alpha$ is defined by the following Equation:

$$a_N = a_z \cos\alpha - a_x \sin\alpha \quad (22)$$

$$a_Y = a_z \sin\alpha + a_x \cos\alpha$$

$$a_z = a_N \cos\alpha + a_V \sin\alpha \quad (23)$$

$$a_z = a_N \sec\alpha + a_x \tan\alpha \quad (24)$$

The coefficient of lift along the Y axis which affects sideslip angle in turn is a function of sideslip angle $\beta$ and this in turn affects the acceleration $a_y$ along the body axis Y of the aircraft in accordance with the following Equations:

$$a_y = (\tfrac{1}{2}\rho V_A^2) C_Y \frac{S}{m} \quad (25)$$

$$C_Y = C_{Y_\beta}\beta + C_{Y_{\delta r}}\delta r + \frac{b}{2V_T} [C_{Y_R} r + C_{Y_p} p] \quad (26)$$

From these equations, it is then possible to generate both an estimated sideslip angle $\beta$ and from that sideslip angle generate a coefficient of lift $C_Y$ along the Y axis and an acceleration signal $a_Y$ along the same Y axis.

FIG. 1 illustrates one form of a circuit for generating an estimated angle of attack signal, an estimated acceleration signal $\hat{a}_N$ normal to the velocity vector, as well as an estimated acceleration signal $\hat{a}_z$ which is colinear with the body axis z. FIG. 1 shows a first or main channel 10 in which the aircraft angle of attack dynamics are simulated to generate from aircraft angular rates such as pitch, roll and pitch rate signals, an estimated angle of attack signal and thereafter by suitable processing a signal $a_N$ representative of the estimated acceleration normal to the velocity vector and a signal $a_z$ which represents the acceleration along the body axis z. Associated with main channel 10 is channel 11 for feeding back a signal inversely proportional to aircraft velocity and acceleration normal to the velocity vector. Channel 12 produces a signal proportional to the gravity forces $g$ on the aircraft. Channels 13 and 14 generate angle of attack and body axis acceleration error signals which are suitably combined and fed back into main channel 10.

Channel 10 has a first input signal $\tilde{p}$ representative of measured aircraft roll rate which is obtained from gyro or other sensing source. The roll rate signal $\tilde{p}$ is applied to a multiplier 21, the other input to which is a signal representative of the cosine of the estimated angle of attack ($\cos\hat{\alpha}$). Cos $\alpha$ is produced by applying the estimated angle of attack signal $\hat{\alpha}$ from channel 10 through a resolver, Scott Tee or other device which produces trigonometric function of the estimated angle of attack, i.e., $\cos\hat{\alpha}$. The output from multiplier 21 which is therefore $\tilde{p}\cos\hat{\alpha}$, is applied as one input to a summing node 22, the other input to which is the product of measured aircraft yaw rate signal $\tilde{r}$ and the sine of the estimated angle of attack $\sin\hat{\alpha}$. $\tilde{r}$ and $\sin\hat{\alpha}$ are multiplied in a multiplier 23 to produce a signal $\tilde{r}\sin\hat{\alpha}$ which is applied as the other input to summing node 22. The output of summing node 22 is therefore $\tilde{p}\cos\hat{\alpha} + \tilde{r}\sin\hat{\alpha}$. The output of summing node 22 is applied to multiplier 24, the other input to which is a signal representative of the tangent of the estimated or measured sideslip angle $\beta$ so that the output of multiplier 24 is $\tan\hat{\beta}\,(\tilde{p}\cos\hat{\alpha} + \tilde{r}\sin\hat{\alpha})$.

The output of multiplier 24 is applied to summing node 25 where the signal is combined with a pitch rate signal $\tilde{q}$ obtained from any suitable inertial rate measuring device, and a signal from the aircraft velocity and acceleration channel 11. This signal, in a manner presently to be described in connection with the description of that channel, is equal to $$\frac{a_N}{V_A \cos\beta} + \frac{g}{V_A \cos\beta}$$

$\cos\phi\cos\theta\cos\alpha + \sin\theta\sin\alpha$. The pitch rate signal $q$ and the signal from channel 11 are added in summing node 25 and the signal from multiplier 24 which is representative of the pitch, roll and the estimated angle of attack is subtracted. As the result, the output of summing network 25 is equal to:

$$\Sigma_{25} = q - \tan\beta\,[\,\tilde{p}\cos\hat{\alpha} + r\sin\hat{\alpha}\,] +$$

$$\frac{a_N}{V_A\cos\beta} + \frac{g}{V_A\cos\beta}\,[\cos\theta\cos\phi\cos\alpha + \sin\theta\sin\alpha]$$

and is therefore equal to $d\alpha/dt$ the rate of change of the estimated angle of attack signal with time. This time derivative of the estimated angle of attack at the output of summing node 25 is applied to an error summing node 26 wherein the angle of attack error signal $\epsilon\hat{\alpha}$ and the body axis acceleration error signal $\epsilon\,a_z$ from channels 11 and 14 are added to produce an error corrected signal at the output of that summing node. The error input signal to summing node 26 from the two error paths are respectively $K11\,(\tilde{\alpha}-\hat{\alpha})$ and $k12\,(\tilde{a}_z-\hat{a}_z)$.

The signal from summing node 26 which represents the error corrected time derivative of the angle of attack is applied to an integrating network 27 which integrates the signal and produces a signal at its output which is proportionate to an estimated angle of attack signal $\tilde{\alpha}$. This angle of attack signal is then applied to a network 30 which produces output signals which are proportional to the coefficient of lift of the aircraft for the varying estimated angles of attack. That is, as pointed out in connection with the discussion of Equation 21 the coefficient of lift for a given aircraft is a function of the dynamic pressure of the aircraft, the airfoil surface, the weight, and the air density, the various pitch moment generating deflections on the various surfaces of the aircraft. For any given aircraft, there is a given relationship for any change in coefficient of lift with angle of attack. In the normally useful range for any aircraft the relationship between the coefficient of lift and $\alpha$ and, concurrently, the rate of change of coefficient of lift with the rate of change with $\alpha$ is usually linear and hence network 30 may take the form of a microprocessor having this information stored therein so that the output of the network gives the proper rate of change of coefficient of lift with $\alpha$. Alternatively, network 30, if the coefficient of lift versus angle of attack characteristics for the aircraft is linear over the useful range, may merely be linear gain amplifier which produces a linear output for the coefficient of lift in the linear rate of change of coefficient of lift with $\alpha$. The output from network 30 is then applied as one input to a multiplier 31 where the coefficient of lift signal is multiplied by a signal ($QS/m$ representing the product of the dynamic pressure $Q = \frac{1}{2}\rho V_A^2$ and the wing surface S divided by mass $m$ of the aircraft. As a result, the output from the multiplier is a signal proportional to $C_L(\frac{1}{2}\rho V_A^2)S/m$ which, as can be seen from Equation 21 is a signal proportional to $-\hat{a}_N$ the acceleration normal to the velocity vector. The signal representative of $\hat{a}_N$ is applied as one input to a multiplier 32. The other input to multiplier 32 is a signal proportional to sec $\alpha$ so that the output of the multiplier is $-\hat{a}_N\sec\alpha$. This signal is applied as one input to 33, the other input to which is a signal from a multiplier 34, which is the product of the measured acceleration component $\tilde{a}_x$ along the $x$ axis of the aircraft and the $\tan\hat{\alpha}$. To this end, a signal $\tilde{a}_x$ proportional to the measured acceleration of the $x$ axis is applied as one input to multiplier 34 and the tangent of the estimated angle of attack $\tan\hat{\alpha}$ is applied to the other input. The output of multiplier 34 is a signal proportional to $+a_x\tan\hat{\alpha}$ when added to $-a_N\sec\alpha$ in summing junction 33, the output of junction 33 is, according to Equation 24, the signal $\hat{a}_z$ representing the estimated acceleration along the $z$ axis. This estimated $z$ axis acceleration component $\hat{a}_z$ is applied as one input to a further summing node 35 where it is compared to the measured acceleration along the $z$ axis, $\tilde{a}_z$. The output of summing node 35 is a signal equal to the difference between the estimated and measured signals and hence represents the body axis estimated acceleration error signal which is fed back through channel 14 to summing node 26 in channel 10.

The gravity component generating channel 12 has two signal inputs proportional to the measured cosines of the Euler angles $\theta$ and $\phi$ applied to multiplier 36 to produce an output signal $\cos\tilde{\theta}\cos\tilde{\phi}$. This signal is applied to a further multiplier 37, the other input of which is $\cos\hat{\alpha}$ so that its output is $\cos\tilde{\theta}\cos\tilde{\phi}\cos\hat{\alpha}$. These signals are applied as one input to a summing node 38 the other input of which is $\sin\tilde{\theta}\sin\hat{\alpha}$. This signal is produced by applying an input signal proportional to the measured angle $\sin\tilde{\theta}$ and a signal proportional to the sin of the estimated angle of attack $\sin\hat{\alpha}$ to multiplier 39 which produces an output signal equal to $\sin \theta \sin \hat{\alpha}$. The output of summing node 38 is therefore the sum of these two signals, i.e., $\cos \tilde{\theta} \cos \tilde{\phi} \cos \hat{\alpha} + \sin \tilde{\theta} \sin \hat{\alpha}$. The output from summing node 38 is multiplied by a factor representing the gravity term $g$ in a proportionality network 39 so that the output of network 39 is $g$ (cosine $\tilde{\theta}$ cosine $\tilde{\phi}$ cosine $\hat{\alpha}$ + sin $\theta$ sin $\hat{\alpha}$). This signal is applied to a summing node 41 in the aircraft velocity and acceleration channel 11. The other input to summing node 41 is a signal proportional to $-\tilde{a}_N$ and the summing node subtracts the two signals so that the output of the summing node is $g$ ($\cos \tilde{\theta} \cos \tilde{\phi} \cos \hat{\delta}$ = sin $\tilde{\theta}$ sin $\hat{\delta}$) + $a_N$). This signal is applied as one input to a dividing network 42 the other input to which is a signal proportional to the product of the aircraft velocity $V_A$ and the cosine of the sideslip angle $\beta$ (i.e., $V_Z \cos \hat{\beta}$). The output of network 42 is therefore:

$$\frac{g}{V_A \cos \beta} [\cos \tilde{\theta} \cos \tilde{\phi} \cos \hat{\alpha} + \sin \theta \sin \hat{\alpha}] + \frac{a_N}{V_A \cos \beta}$$

This signal is applied as one of the inputs to summing node 25 in channel 10 so that the output is a signal, which according to Equation 18 is proportional to the rate of change of the angle of attack, $d\alpha/dt$.

The input to angle of attack error channel 13 is the signal from integrator 27 which is the estimated angle of attack signal $\alpha$. This signal is applied to a summing node 43 along with the measured angle of attack signal $\alpha$ to produce an output which is equal to their difference. The output from summing node 43 is therefore the estimated angle of attack error signal. This error signal is then multiplied by a scaling factor $K11$ in a suitable network 44. This signal $K11$ ($\tilde{\alpha} - \hat{\alpha}$) is applied to an error summing node 45, the other input to which is from the body axis acceleration error channel 14. The output of error summing node 44 is applied to summing node 26 in the main channel 10 to produce an output signal from that node which is a corrected rate of change of angle of attack signal which is then integrated to produce the angle of attack signal.

Body axis acceleration error channel 14 takes the output from summing node 35 in channel 10 which is the difference between the estimated acceleration along the z axis $\hat{a}_z$ and the measured acceleration along the z axis $\tilde{a}_z$. This difference signal is thus the z axis acceleration error signal. This error signal is applied to a proportionality network 46 to produce at the output a signal which is proportional to $K12$ ($\tilde{a}_z - \hat{a}_z$) which is applied to error summing node 45.

It can be seen therefore that the network illustrated in FIG. 1 produces an estimated angle of attack signal $\hat{\alpha}$, an estimated acceleration signal $\hat{a}_N$ representing acceleration which is normal to the velocity vector, $a_N$ as well as an estimated acceleration signal $\hat{a}_z$ representing acceleration along the aircraft body z axis which then may be used for control or display purposes in an aircraft.

Figure 2:
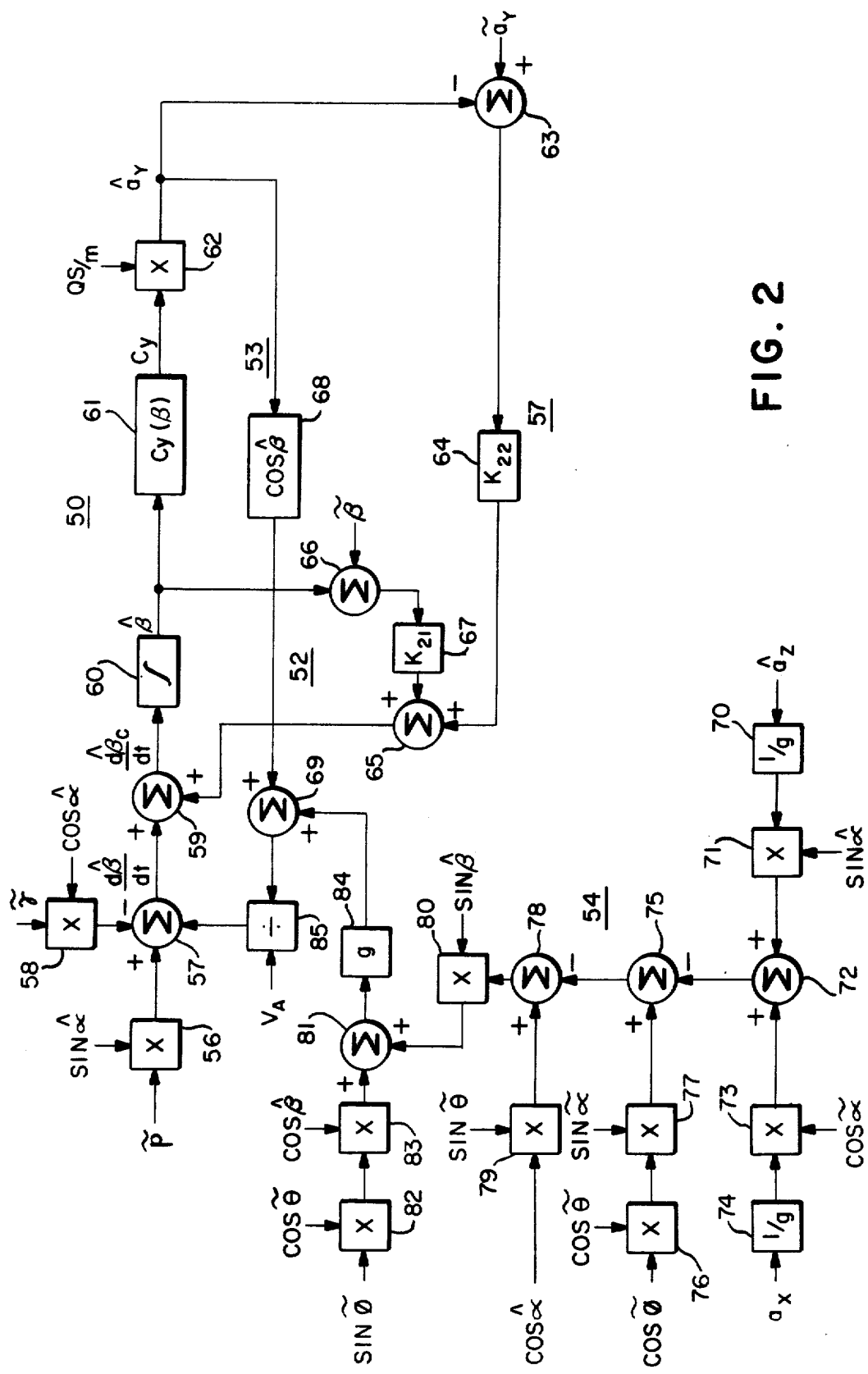
FIG. 2 is a block diagram of circuitry for producing an estimated sideslip angle for the aircraft.

In a similar fashion FIG. 2 shows a network for producing an estimated sideslip angle $\beta$ and an estimated acceleration signal $\hat{a}_y$ along the Y body axis of the aircraft. Thus, a main channel 50 is provided in which the aircraft sideslip angle dynamics are simulated to produce an estimated sideslip angle which is then further processed to produce a signal proportional coefficient of lift along the Y axis, $C_y$, and an acceleration signal $\hat{a}_Y$ along the Y axis. In addition to the main channel, there is a body axis acceleration error channel 51, a sideslip angle error channel 52, an aircraft velocity and acceleration channel 53, and a gravity component channel 54.

A measured roll rate input signal $\tilde{p}$ from a suitable roll rate measuring inertial device, is applied to a multiplying network 56 in channel 50, the other input to which is a signal proportional to the sine of the estimated angle of attack $\sin \hat{\alpha}$. Sin $\hat{\alpha}$ is derived from any suitable network such as an estimator of the type shown in FIG. 1. The output from this network, which is $\tilde{p} \sin \hat{\alpha}$, is applied as one input to a summing node 57. The other inputs to node 57 are from multiplier 58, the output of which is a signal proportional to $\tilde{r} \cos \hat{\alpha}$, and from network 53, the output of which is a signal proportional to $$\frac{a_y \cos \beta - (\tilde{a}_x \cos \hat{\alpha} + \hat{a}_z \sin \alpha) \sin \hat{\beta}}{V_A}$$

$$+ \frac{g}{V_A} [\cos \tilde{\theta} \sin \tilde{\phi} \cos \hat{\beta} + \sin \tilde{\theta} \cos \hat{\alpha} \sin \hat{\beta}$$

$$- \cos \tilde{\phi} \cos \tilde{\theta} \sin \alpha \sin \beta ]$$

The input from channel 53 and from multiplier 56 are added in summing node 57 and the output from multiplier 58 subtracted so that the output of summing node 57 is a signal proportional to:

$$\Sigma_{58} = \tilde{p} \sin \hat{\alpha} - \tilde{r} \cos \alpha + \frac{a_y \cos \beta - (\tilde{a}_x \cos \hat{\alpha} + \hat{a}_z \sin \alpha) \sin \beta}{V_A}$$

$$\pm \frac{g}{V_A} [\cos \tilde{\theta} \sin \tilde{\phi} \cos \hat{\beta} + \sin \tilde{\theta} \cos \hat{\alpha} \sin \hat{\beta} - \cos \tilde{\phi} \cos \tilde{\theta} \sin \hat{\alpha} \sin \beta ]$$

which, as will be noted from Equation 19 is a signal proportional to $d\beta/dt$, i.e., the time derivative of the estimated sideslip angle.

This signal is applied to an error summing node 59 which has its other input from the angle of sideslip error channel 52 and the body axis acceleration error signal channel 51. The output of summing node 59 is therefore an error corrected signal. The signal is applied to an integrating network 60 in which the signal is integrated to produce a signal which is the estimated sideslip angle $\hat{\beta}$ for the aircraft. The estimated angle of sideslip signal from integrator 60 is applied to a lift coefficient network 61 which produces an output signal $C_y$ proportional to the rate of change of lift coefficient along the sideslip axis in response to the sideslip angle $\beta$. That is, for a given aircraft the lift characteristic coefficient along the Y axis for any given sideslip angle $\beta$ is a characteristic determined by the control surface deflection, air density, etc., which is determined by the configuration of any particular aircraft. This information may be stored in a microprocessor which is included in the network 61 so that the output $C_y$ from the network for every angle $\beta$ is a signal which has the relationships as defined in Equation 26. The coefficient of lift in the y axis $C_y$ is applied as one input to a multiplier 62, the other input to which is a signal proportional to $QS/m$; i.e., the product of the dynamic pressure Q, the wing area S divided by the mass of the aircraft $m$. By definition therefore, the output of multiplier 62 is a signal $\hat{a}_y$, representing the estimated acceleration component along the $y$ axis.

The $\hat{a}_y$ signal is applied to the body axis acceleration error channel 51 and compared in a summing node 63 to the measured acceleration signal $\tilde{a}_y$. The output from summing node 63 is therefore the difference between the estimated and the measured acceleration component along the $y$ axis and represents an error signal which is applied to a scaling network 64 to produce an output signal proportional to $K_{22}(\hat{a}_y - \tilde{a}_y)$. This error signal is applied to an error summing node 65. The other input to this node is an error signal from channel 52 which is proportional to the angle of sideslip error. That is, the estimated sideslip signal $\hat{\beta}$ is applied to a summing node 66 in channel 52 and compared to the measured sideslip angle $\tilde{\beta}$. The output of summing node 66 is therefore a signal representative of the difference between the estimated and the actual measured sideslip angle and this error signal is applied to scaling network 67 to produce the other input to error summing node 65, i.e., a signal proportional to $K_{21}(\tilde{\beta} - \hat{\beta})$. These two error signals are in turn applied to error summing node 59 in channel 50.

The estimated acceleration component along the $y$ axis $\hat{a}_y$ is processed in channel 53 by applying this signal to a multiplier network 68 in which the acceleration component is multiplied by $\cos \hat{\beta}$ and the product is applied to a summing node 69. The other input to node 69 is from the gravitational component generating network 54.

Network 54 includes a first summing path in which acceleration components along the $x$ and $z$ axes are processed to produce signals which are proportional to both the body acceleration components and the gravity component $g$. Thus, an acceleration signal along the $z$ axis $\hat{a}_z$ is applied to a multiplying network 70 in which the acceleration component is multiplied by a gravitational force factor $1/g$ to produce a signal proportional to $\hat{a}_z/g$. The signal is applied as one input to a multiplier 71 in which the signal is multiplied by the sine of the estimated angle of attack $\sin \hat{\alpha}$. The output of multiplier 71 is thus $(a_z \sin \hat{\alpha}/g)$. This signal is applied as one input for summing node 72 the other input to which is a signal proportional to the product of gravitational force $1/g$ and the acceleration component along the $x$ axis $a_x$. Thus, an acceleration signal $\hat{a}_x$ is multiplied by $1/g$ in a multiplier 73 and then multiplied by the cosine of the angle of attack $\cos \hat{\alpha}$ in multiplier 74. The other input to summing node 72 is therefore $(\tilde{a}_x \cos \hat{\alpha}/g)$. The output of summing node 72 is therefore $(\tilde{a}_x/g)\cos \hat{\alpha} + (\hat{a}_z/g)\sin \hat{\alpha}$. This signal is applied as one input to a summing node 75, the other input of which is a signal from two multipliers 76 and 77 which respectively have inputs proportional to the Euler angles (i.e., the cosine of the angle $\tilde{\phi}$ and the cosine of the angle $\tilde{\theta}$) as well as the sine of the angle of attack $\hat{\alpha}$. The input to summing node 75 from these two multipliers is therefore cosine $\phi$ cosine $\theta$ cosine $\hat{\alpha}$. As a result, the output of summing node 75 is a signal $1/g (\tilde{a}_x \cos \hat{\alpha} + \sin \hat{\alpha}) + \cos \phi \cos \theta \cos \hat{\alpha}$. This signal is applied to summing node 78, the other input to which is a signal from multiplier 79 which is proportional to $\sin \tilde{\theta} \cos \hat{\alpha}$. The two signals are subtracted in summing node 78 to produce a difference signal equal to $$1/g (\tilde{a}_x \cos \hat{\alpha} + \sin \hat{\alpha}) + \cos \phi \cos \theta \cos \hat{\alpha} - \sin \theta \cos \hat{\alpha}.$$

The signal is then applied to multiplier 80 in which the signal is multiplied by a signal proportional to $\sin \tilde{\beta}$ to produce the output of multiplier 80 a signal proportional to:

$$1/g (\tilde{a}_x \cos \hat{\alpha} + \hat{a}_z \sin \hat{\alpha}) + \cos \phi \cos \theta \cos \hat{\alpha} - \sin \theta \cos \hat{\alpha} \sin \beta$$

This signal is applied as one input to a summing node 81, the other input to which is a signal from multipliers 82 and 83 proportional to the product of the Euler angles and the sideslip angle. The output from multipliers 82 and 83 is $\sin \tilde{\phi} \cos \tilde{\theta} \cos \alpha$. The output of summing node is therefore:

$$1/g (\tilde{a}_x \cos \hat{\alpha} + \hat{a}_z \sin \hat{\alpha}) + \cos \phi \cos \theta \cos \hat{\alpha} - \sin \theta \cos \hat{\alpha} \sin \beta + \sin \phi \cos \theta \cos \beta$$

This signal is applied to a network 84 in which the signal is multiplied by a factor proportional to the gravitational force $g$. This signal is then applied to a summing node 69 where it is combined with the signal proportional to product of the acceleration along the $y$ axis $\hat{a}_y$ and the cosine of the sideslip $\cos \hat{\beta}$. The output of summing node 69 is in turn applied to a dividing network 85 the other input to which is a factor proportional to the aircraft velocity $V_A$ so that the output of network 85 is a signal proportional to:

$$\Sigma_{85} = \frac{a_Y \cos \hat{\beta} - (a_x \cos \alpha + a_z \sin \alpha) \sin \beta}{V_A}$$
$$+ g/V_A [\cos \theta \sin \phi \cos \beta + \sin \theta \cos \alpha \sin \beta - \cos \phi \cos \theta \sin \alpha \sin \beta]$$

This signal is then applied as one input to summing node 57 in channel 50 to produce at the output of that summing node a signal which is proportional to the rate of change of the estimated sideslip angle with time which signal is integrated and processed to produce both the estimated angle of attack $\beta$ as well as $a_y$, the acceleration signal along the $y$ axis $a_Y$.

It can be seen therefore that a network has been shown and described for estimating the angle of sideslip $\beta$ for any given aircraft as well as producing a signal from the sideslip angle indicating the acceleration component along the $y$ axis for any given sideslip angle which signal may be utilized both for control purposes or display purposes in any aircraft system.

While a number of embodiments of the invention have been illustrated and described, it will be apparent that various modifications may be made in the instrumentalities, arrangements and circuitry described without departing from the true spirit and scope of the invention as defined in the appended claims.

What is claimed as new and desired to be secured by Letters Patent of the United States is:

1. In an estimator network for estimating aircraft parameters, such as angle of attack or sideslip angle from measured aircraft parameters such as pitch, roll, speed, acceleration and gravity forces, a. a network including:
  1. means for producing in response to measured aircraft angular pitch and roll measurements a signal proportional to the rate of change of the aircraft parameter to be estimated,
  2. means for integrating the rate of change signal to produce a signal proportional to the estimated parameter, and
  3. means simulating aircraft dynamic response to linear velocities, acceleration and angular body rates along given aircraft axes including a Kalman filter configuration responsive to said integrated rate of change signals from said means for integrating to produce a signal representative of the aircraft dynamic response so as to produce an estimated acceleration signal with respect to given aircraft axes.

2. The estimator according to claim 1 wherein the aircraft parameter to be measured is angle of attack and the means for simulating the aircraft response has a response characteristic such that the output signal from said means represents the coefficient of lift characteristics of the aircraft in response to estimated angle of attack signals applied thereto and means to process the output signals from said means to produce an estimated lift acceleration signal.

3. The estimator according to claim 1 wherein the aircraft parameter to be measured is sideslip angle and the means for simulating the aircraft response has a response characteristic such that the output signal from said means represents the coefficient of lift characteristics of the aircraft along an axis of sideslip in response to estimated angles of sideslip signals applied thereto, and means to process the output signals from said means to produce an estimated acceleration signal along that axis.

* * * * *